United States Patent Office 2,927,909
Patented Mar. 8, 1960

2,927,909

MASONRY WATER REPELLENT COMPOSITION CONTAINING POLYSILOXANE MIXTURE AND METHOD OF MAKING SAME

James D. Lyons and Barber C. Carlson, Midland, Mich., assignors to Dow Corning Corporation, Midland, Mich., a corporation of Michigan No Drawing. Application November 4, 1957
Serial No. 694,102

2 Claims. (Cl. 260—42)

This application relates to silicone compositions especially designed for water repellent coatings on masonry.

Silicones have been used to render masonry water repellent for many years. The heretofore employed silicones have met with considerable commercial success and are used generally on all types of masonry. However, the heretofore employed silicones tended to give higher water absorption on mortar than on brick or concrete surfaces. Also, many of the previously employed silicones did not maintain excellent water repellency after prolonged exposure to weather.

It is the object of this invention to provide a novel silicone composition which when applied to masonry will reduce the absorption of water by mortar and will maintain the water repellent property after prolonged exposure to weather.

This invention relates to a mixture of (1) from 65 to 85% by weight of a methylsiloxane having the composition of from 65 to 80 mol percent monomethylsiloxane, from 15 to 30 mol percent dimethylsiloxane and not more than 5 mol percent trimethylsiloxane, said siloxane (1) containing from 1 to 12% by weight silicon-bonded methoxy groups and (2) from 15 to 35% by weight of monopropylsiloxane containing from 15 to 60% by weight silicon-bonded ethoxy groups.

Applicants have found that the above combination of methyl and propylsiloxane containing the respective amounts of methoxy and ethoxy groups give the best overall performance on masonry of any known silicone water repellent. It has also been found that when any of the above critical limitations are exceeded, inferior performance is obtained.

Siloxane (1) employed in this invention can be either a methoxylated copolymer of monomethylsiloxane and dimethylsiloxane or it can be a methoxylated copolymer of monomethylsiloxane, dimethylsiloxane, or trimethylsiloxane. Siloxane (1) is best prepared by reacting a mixture of methylchlorosilanes with a mixture of water and methanol, in which the water is present in amount less than the theoretical required to hydrolyze all of the chlorine in the chlorosilanes. It is best to have a suitable solvent such as xylene or toluene present during the hydrolysis.

Siloxane (2) is best prepared by hydrolyzing propyltrichlorosilane in a mixture of ethanol, water and a suitable solvent such as xylene or toluene, in which the amount of water is less than the theoretical amount required to react with all of the chlorine.

After preparation, the alkoxylated siloxanes are then blended in the desired proportions. They can be diluted out to a desired concentration for use on masonry. Suitable solvents for such dilution are toluene, xylene, mineral spirits and chlorinated hydrocarbons. The siloxane can be applied to the masonry with any concentration, but the preferred concentration is from 2 to 5%.

It should be understood that the compositions of this invention can be employed for other uses such as the water repelling of fabrics and in the preparation of coating compositions.

The term "masonry" as employed herein includes such building and surfacing materials as brick, concrete, cinder block, mortar, tile, stone, stucco and equivalent materials.

In the absorption tests given below the procedure was to place a 2-inch cube of material in water which is ¼-inch deep. The weight of water absorbed during a given interval of time was then measured.

EXAMPLE 1

A mixture of (1) 75% by weight of a copolymer of 75 mol percent monomethylsiloxane, 24 mol percent dimethylsiloxane, and 1 mol percent trimethylsiloxane, which copolymer contained 8% by weight silicon-bonded methoxy groups was mixed with (2) 25% by weight of a monopropylsiloxane containing 18.4% by weight silicon-bonded ethoxy groups. The mixed siloxanes were diluted with naphthol mineral spirits to give a concentration of 5% by weight combined siloxane. The solution was applied to various types of masonry and in each case the masonry was allowed to air dry for 24 hours and the water absorption and contact angle was determined. The results are shown in the table.

Table I

| Type Masonry | Water Absorption in percent by wt. | | Contact Angle |
|---|---|---|---|
| | 24 hrs. | 72 hrs. | |
| Cement cubes | .49 | .85 | Very good. |
| Chicago common brick | .03 | .08 | Do. |
| Mortar | .75 | 1.2 | |

In addition, the solution of the siloxane was applied to a brick wall. The water repellency of the treated wall is excellent after 5 months and is much better than other sections of the same wall treated with commercial silicone masonry water repellents.

EXAMPLE 2

A mixture of 75% by weight of siloxane (1) of Example 1 and 25% by weight of a monopropylsiloxane containing 42.8% by weight ethoxy groups was diluted to 5% by weight total silicone with naphthol mineral spirits. A solution was applied to mortar and Handley-Roman brick. The materials were allowed to air-dry for 24 hours and the water absorption was adetermined as before. The results are in the table.

Table II

| Type Masonry | Water Absorption in percent by wt. | |
|---|---|---|
| | 24 hrs. | 72 hrs. |
| Mortar | .55 | .91 |
| Handley-Roman brick | .17 | .11 |

EXAMPLE 3

Equivalent results were obtained when a mixture of 70% by weight of a copolymer of 75 mol percent monomethylsiloxane and 25 mol percent dimethylsiloxane containing 10% by weight silicon-bonded methoxy groups and 30% by weight of a propylsiloxane containing 50% by weight silicon-bonded ethoxy groups, is applied to masonry in accordance with the procedure of Example 1.

That which is claimed is:

1. A composition of matter consisting essentially of a mixture of (1) from 65 to 85% by weight of a methylsiloxane having a composition of from 65 to 80 mol percent monomethylsiloxane, from 15 to 30 mol percent dimethylsiloxane and up to 5 mol percent trimethylsiloxane, said siloxane (1) containing from 1 to 12% by weight silicon-bonded methoxy groups and (2) from 15 to 35% by weight of a monopropylsiloxane containing from 15 to 60% by weight silicon-bonded ethoxy groups.

2. A method of rendering masonry water repellent comprising applying to the masonry an organic solvent solution of a mixture of (1) from 65 to 85% by weight of a methylsiloxane having a composition of from 65 to 80 mol percent monomethylsiloxane, from 15 to 30 mol percent dimethylsiloxane and up to 5 mol percent trimethylsiloxane, said siloxane (1) containing from 1 to 12% by weight silicon-bonded methoxy groups and (2) from 15 to 35% by weight of a monopropylsiloxane containing from 15 to 60% by weight silicon-bonded ethoxy groups, and thereafter allowing the masonry to dry.

References Cited in the file of this patent

UNITED STATES PATENTS

| | | |
|---|---|---|
| 2,574,168 | Brick | Nov. 6, 1951 |
| 2,695,276 | Hatcher | Nov. 23, 1954 |
| 2,706,723 | Bass | Apr. 19, 1955 |